(No Model.)
G. MILNER.
COMBINED BROILER AND BAKER.
No. 427,519. Patented May 6, 1890.
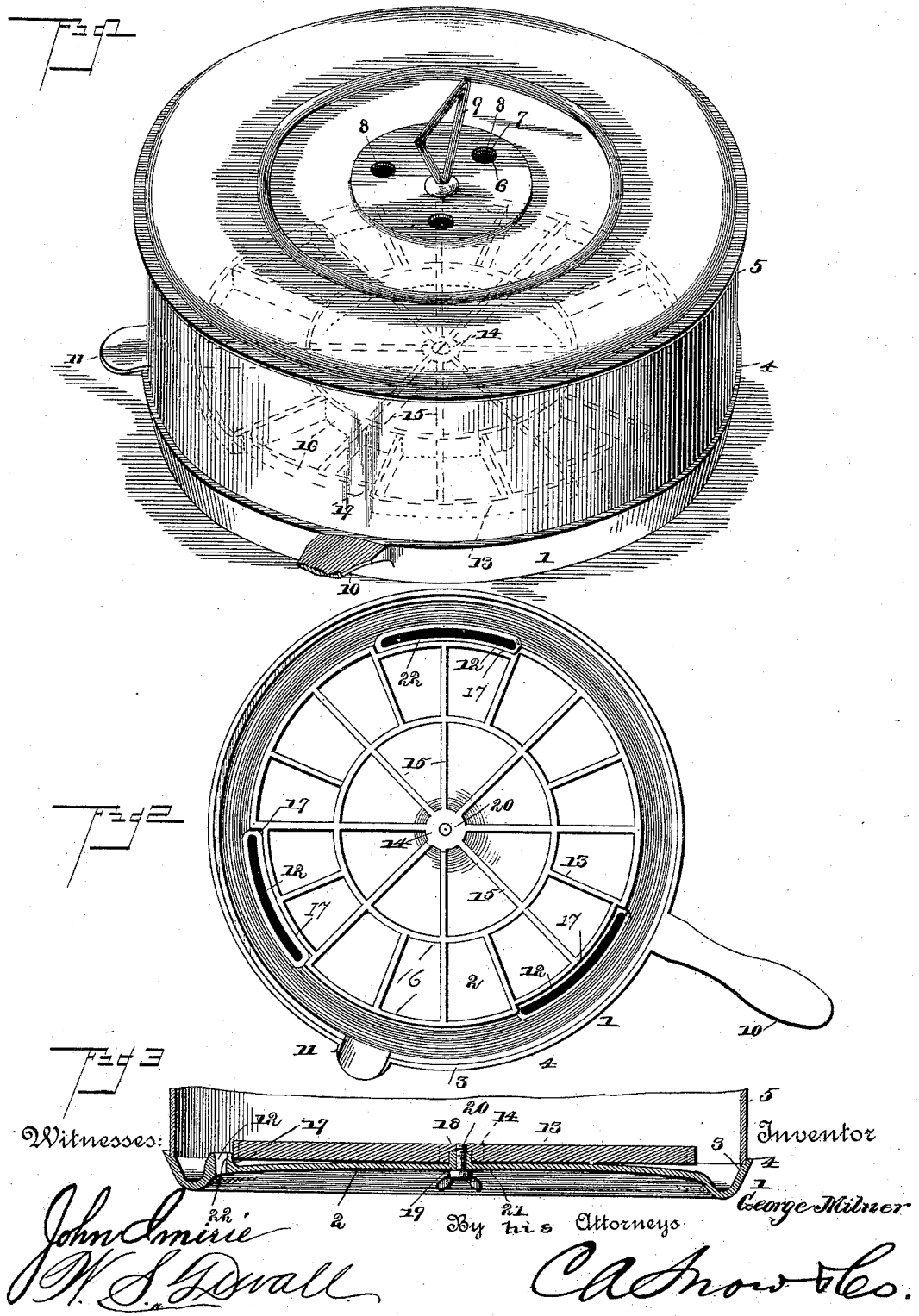

United States Patent Office.

GEORGE MILNER, OF PHILADELPHIA, PENNSYLVANIA, ASSIGNOR OF ONE-HALF TO THOMAS B. SHAPTER, OF SAME PLACE.

COMBINED BROILER AND BAKER.

SPECIFICATION forming part of Letters Patent No. 427,519, dated May 6, 1890.

Application filed November 19, 1889. Serial No. 330,845. (No model.)

*To all whom it may concern:*

Be it known that I, GEORGE MILNER, a citizen of the United States, residing at Philadelphia, in the county of Philadelphia and State of Pennsylvania, have invented a new and useful Combined Broiler and Baker, of which the following is a specification.

This invention has relation to combined broilers and bakers; and the objects and advantages of the invention will hereinafter appear, and be particularly pointed out in the claims.

Referring to the drawings, Figure 1 is a perspective of a broiler constructed in accordance with my invention. Fig. 2 is a plan, the cover removed. Fig. 3 is a transverse section.

Like numerals of reference indicate like parts in all the figures of the drawings.

The broiler comprises two sections, the lower section being adapted for the support of the upper section.

1 represents the lower section or pan, circular in plan and provided with a central raised and preferably slightly convexed bottom 2, around which there depends an annular groove 3, the outer wall of which is extended above the bottom and provided with an L-shaped groove 4, adapted to receive a removable dome or cover 5, the top of which is provided with a series of openings 6 adapted to be closed at will by means of a circular plate 7, having openings 8 corresponding with those in the top and pivotally connected to the top by means of a rotatable handle 9, by which, also, said top or cover may be lifted or placed upon the broiler. The broiler is also provided with a suitable handle 10, projecting from the edge of the same, and with a lip 11, for pouring the juice from the annular groove. The bottom of the broiler 1 is also provided with one or a series of slots 12 near the inner edges of the groove.

13 represents the spider or broiler frame, and the same is circular, consisting of a central hub 14, from which radiate a series of arms 15, connected by circular rims 16, the outer one of which is recessed at intervals, as at 17, to receive the flanges 22 of the slots 12 formed in the bottom of the broiler. The central hub of the spider or broiler frame is perforated, as at 18, and the bottom of the pan is similarly perforated, as at 19, and through the two are inserted a binding-bolt 20, having a thumb-nut.

By reason of the depending annular flange of the pan it is apparent that the bottom of the latter will be elevated above the surface of the stove, and through the medium of the slots 12 formed in the bottom sufficient air may enter to provide for a free circulation under the bottom, and thus preserve the articles being broiled from burning. By reason of the slight convexity of the bottom it will be noted that the under edges of the spider or broiler will be slightly raised above said bottom and thus permit of the juice of the meat broiled to trickle down into the annular groove of the broiler, whereby the same may be poured over the broiled meat after the broiling, or be converted into gravy, as desired. If the utensil should become clogged by grease, &c., the same may be readily cleaned by loosening the set-screw and removing the spider or broiler from the pan, thus permitting free access to all the parts.

It will be apparent that the spider and pan may be conveniently cast, and said castings assembled, without any hand-finishing whatever.

The central perforation in the pan is encircled by an annular wall or flange 21, formed upon the upper surface of said pan, which takes into a similar recess formed in the hub of the spider and encircling the opening in the same. A similar flange 22 encircles each of the slots of the broiler, and by these flanges the juice is preserved against waste through the openings.

The elevation of the spider or broiler above the bottom of the pan and the location of the openings 12 permits of a free circulation of air below the meat while being broiled, so as to avoid any tendency to burning. Again, the device may be used as a baker by closing the openings 6, and in such case the articles to be baked are placed on top of the pan. Thus small puddings may be cooked or potatoes boiled. In this way I combine two utensils in one implement.

Having described my invention, what I claim is—

1. The pan having an annular flange provided at its edge with a groove or recess, in combination with the circular dome or cover, the lower edge of which takes in the groove and having its top perforated, a rotatable handle mounted in the top, and a plate secured to the handle and provided with openings adapted to be thrown into register with those in the top, the handle serving to rotate the plate, and also as a handle for the cover, substantially as specified.

2. The pan having the raised central bottom slightly convexed, the surrounding groove, and the openings 12, surrounded by the flanges 22, combined with the spider-frame consisting of a central hub having radial arms connected by a rim and having its hub centrally perforated to agree with the perforations in the bottom, and the binding-screw mounted in the perforations and having its rim recessed to receive the flanges 22, substantially as specified.

3. The combination, with the pan provided at its center with the opening, and an upwardly-disposed encircling flange, of the spider having the central hub provided with a central perforation surrounded by a recess adapted to receive the flange of the pan, and a set-screw threaded in the openings, substantially as specified.

4. The combination, with the convexed pan surrounded by an annular channel or groove, and centrally perforated, of a plain or flat spider mounted upon and having contact with the pan at its central portion, and having its edges disposed above the pan, and a set-screw inserted through the perforation in the pan and through a similar perforation in the spider, substantially as specified.

5. The pan 1, having the openings 12, and the depending peripheral groove-flange 3, combined with the removable spider or broiler frame applied to the upper face of the pan within the openings 12 and the flange, and centrally secured in place by a screw, as set forth.

In testimony that I claim the foregoing as my own I have hereto affixed my signature in presence of two witnesses.

GEORGE MILNER.

Witnesses:
LISLE STOKES,
WM. MACFARLAND.